United States Patent
Bardalai et al.

(10) Patent No.: US 8,180,219 B2
(45) Date of Patent: May 15, 2012

(54) PROVIDING SIGNAL REACHABILITY INFORMATION TO A NETWORK

(75) Inventors: Snigdho C. Bardalai, Plano, TX (US); Abinder S. Dhillon, Allen, TX (US); Sanjay Gera, Richardson, TX (US); Taichi Ueki, Yokohama (JP); Hideaki Sugiya, Fujisawa (JP); Vibha Sarin, Murphy, TX (US)

(73) Assignee: Fujitsu Limited, Kawasaki (JP)

( * ) Notice: Subject to any disclaimer, the term of this patent is extended or adjusted under 35 U.S.C. 154(b) by 1024 days.

(21) Appl. No.: 12/109,414

(22) Filed: Apr. 25, 2008

(65) Prior Publication Data

US 2009/0269061 A1    Oct. 29, 2009

(51) Int. Cl.
*H04B 10/20* (2006.01)

(52) U.S. Cl. ........... 398/58; 398/28; 398/33; 398/38; 398/45; 398/48; 370/352; 370/392; 370/389; 370/401

(58) Field of Classification Search ............ 398/25, 398/26, 27, 28, 29, 30, 31, 32, 33, 34, 38, 398/45, 46, 47, 48, 49, 50, 56, 57, 59, 79, 398/83, 58; 370/392, 401, 254, 252, 238.1, 370/352, 389, 535, 238, 400, 235, 230, 242, 370/465, 466

See application file for complete search history.

(56) References Cited

U.S. PATENT DOCUMENTS

| | | | |
|---|---|---|---|
| 7,899,326 B2 * | 3/2011 | Shi et al. | 398/50 |
| 2002/0118647 A1 * | 8/2002 | Maeno | 370/238.1 |
| 2006/0215660 A1 * | 9/2006 | Vigoureux et al. | 370/392 |
| 2009/0304380 A1 * | 12/2009 | Sadananda et al. | 398/26 |

OTHER PUBLICATIONS

"*The Dynamic Optical Transport Solution*", The Fiber Service Platform, FSP 3000RE, ADVA™ Optical Networking, www.advaoptical.com, 2 pages, Feb. 2007.
"*The Scalable Multi-Degree ROADM Solution*", The Fiber Service Platform, FSP 3000RR, ADVA™ Optical Networking, www.advaoptical.com, 2 pages, Feb. 2007.
NETSMART® 2000, Network Design and Planning Tool, Comprehensive Network Design, Fujitsu Network Communications Inc., www.us.fujitsu.com, 2 pages, Nov. 2007.
"*The Scalable Optical Transport Solution*", FSP 3000, ADVA™ Optical Networking, www.advaoptical.com, 2 pages, Jul. 2008.

* cited by examiner

*Primary Examiner* — Hanh Phan
(74) *Attorney, Agent, or Firm* — Baker Botts L.L.P.

(57) ABSTRACT

In particular embodiments, providing signal reachability information to a network includes establishing signal reachability information at a network node of the network. The signal reachability information describes attributes that affect reachability of an optical signal. The signal reachability information is inserted into an advertisement, and the advertisement is sent to network nodes of the network.

17 Claims, 4 Drawing Sheets

PROVIDING SIGNAL REACHABILITY INFORMATION TO A NETWORK

TECHNICAL FIELD

This invention relates generally to the field of communication networks and more specifically to providing signal reachability information to a network.

BACKGROUND

A network includes network nodes through which circuits, or paths, may be set up. Setting up circuits typically involves information about abilities and constraints of the network nodes. Known techniques for determining this information, however, may not be effective in certain situations.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

OVERVIEW

In particular embodiments, providing signal reachability information to a network includes establishing signal reachability information at a network node of the network. The signal reachability information describes attributes that affect reachability of an optical signal. The signal reachability information is inserted into an advertisement, and the advertisement is sent to network nodes of the network.

DESCRIPTION OF EXAMPLES

Figure 1:
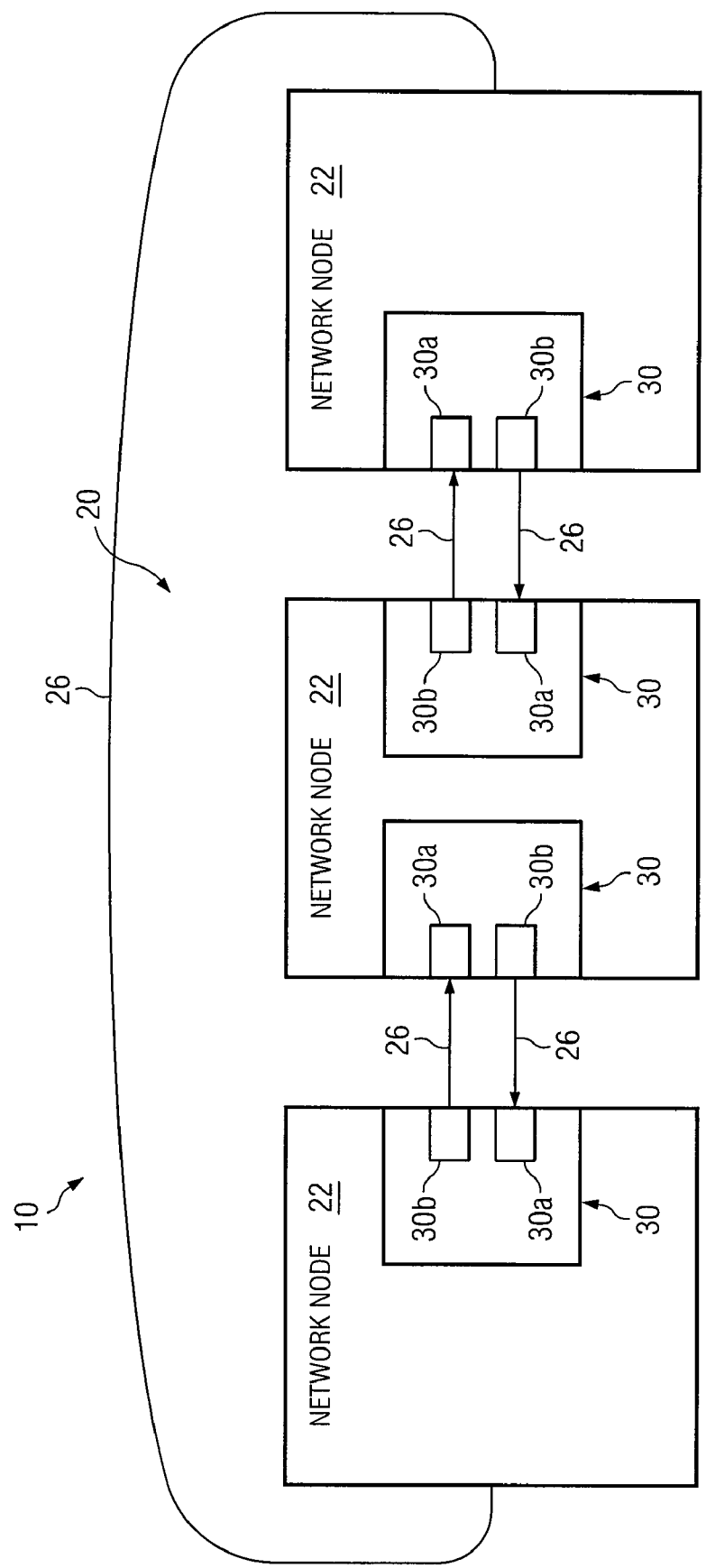
FIG. 1 illustrates an embodiment of a network that includes network nodes.

FIG. 1 illustrates an embodiment of a network 10 that includes network nodes 22. In particular embodiments, a link (for example, a traffic engineering (TE) link) of a network node 22 may be configured to establish signal reachability information that describes attributes that affect the reachability of an optical signal. Network node 22 may insert the signal reachability information in an advertisement (such as a traffic engineering link advertisement) and send the advertisement to other network nodes 22. The information may be distributed on-line while network node 22 is active.

In the illustrated embodiment, network 10 represents a communication network that allows components, such as nodes, to communicate with other components. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

According to the illustrated embodiment, network 10 includes a ring network 20. Ring network 20 includes network nodes 22 and spans 26. In one embodiment, ring network 20 communicates information through signals. A signal may comprise an optical signal transmitted as light pulses. As an example, an optical signal may have a frequency of approximately 1550 nanometers and a data rate of 10, 20, 40, or over 40 gigabits per second (G). A signal may comprise a synchronous transport signal (STS) that communicates information in packets. Information may include voice, data, audio, video, multimedia, control, signaling, and/or other information. A signal may travel through a circuit, or path, from a source network node 22 to a destination network node 22.

According to one embodiment, ring network 20 may utilize protocols such as Resilient Packet Ring (RPR) protocols, according to which packets are added, passed through, or dropped at each network node 22. Ring network 20 may utilize any suitable routing technique, such as Generalized Multi-Protocol Label Switching (GMPLS) techniques. Ring network 20 may utilize any suitable transmission technique, such as wavelength division multiplexing (WDM) techniques.

In the illustrated embodiment, network nodes 22 include any suitable devices such as network elements operable to route packets through, to, or from ring network 20. Examples of network elements include routers, switches, wavelength division multiplexers (WDMs), access gateways, endpoints, softswitch servers, trunk gateways, access service providers, Internet service providers, or other device operable to route packets through, to, or from ring network 20.

A network node 22 may include logic, such as control plane logic and/or bearer plane logic. Control plane logic manages routing of packets, and bearer plane logic routes the packets.

A network node 22 includes links 30 (30a and/or 30b) that process incoming and/or outgoing signals. In particular embodiments, links 30 represent traffic engineering (TE) links. A traffic engineering link may be a subinterface capable of carrying Generalized Multi Protocol Label Switching (GMPLS) traffic engineered traffic. A link 30 may be an input link 30a that receives an input signal for node 22 or an output link 30b that sends an output signal from node 22. A link pair comprises an input link 30a and output link 30b of a path that communicates a signal.

Spans 26 represent any suitable fibers operable to transmit a signal, such as optical fibers. A span 26 communicates one or more channels, where a channel represents a particular wavelength. A wavelength may be identified by a wavelength channel identifier.

In particular embodiments, a link 30 (such as a traffic engineering link) of network node 22 may be configured to establish signal reachability information that describes attributes that affect the reachability of an optical signal. Link 30 may insert the signal reachability information in an advertisement (such as a traffic engineering link advertisement) and send the advertisement to other network nodes 22. Network node 22 may use the GMPLS protocol to distribute signal reachability information while on-line or off-line.

In particular embodiments, a link 30 (for example, a traffic engineering link) of network node 22 may be configured to establish wavelength connectivity information that describes wavelength availability between an input link 30a and output link 30b. Network node 22 may insert the signal reachability information in an advertisement (such as a traffic engineering link advertisement) and send the advertisement to other network nodes 22. The information may be provided in real time.

In particular embodiments, control plane logic of network node 22 may be configured to establish that planning pre-conditions for planning a circuit have been satisfied and to initiate the planning of the circuit. The control plane logic may also establish that reservation pre-conditions for reservation of resources for the circuit have been satisfied and initiate reservation of the resources for the circuit. The control plane logic may also establish that activation pre-conditions for activation of the circuit have been satisfied and initiate the activation of the circuit.

A component of system 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 without departing from the scope of the invention. The components of network 10 may be integrated or separated. Moreover, the operations of network 10 may be performed by more, fewer, or other components. Additionally, operations of network 10 may be performed using any suitable logic. As used in this document, "each" refers to each member of a set or each member of a subset of a set.

Figure 2:
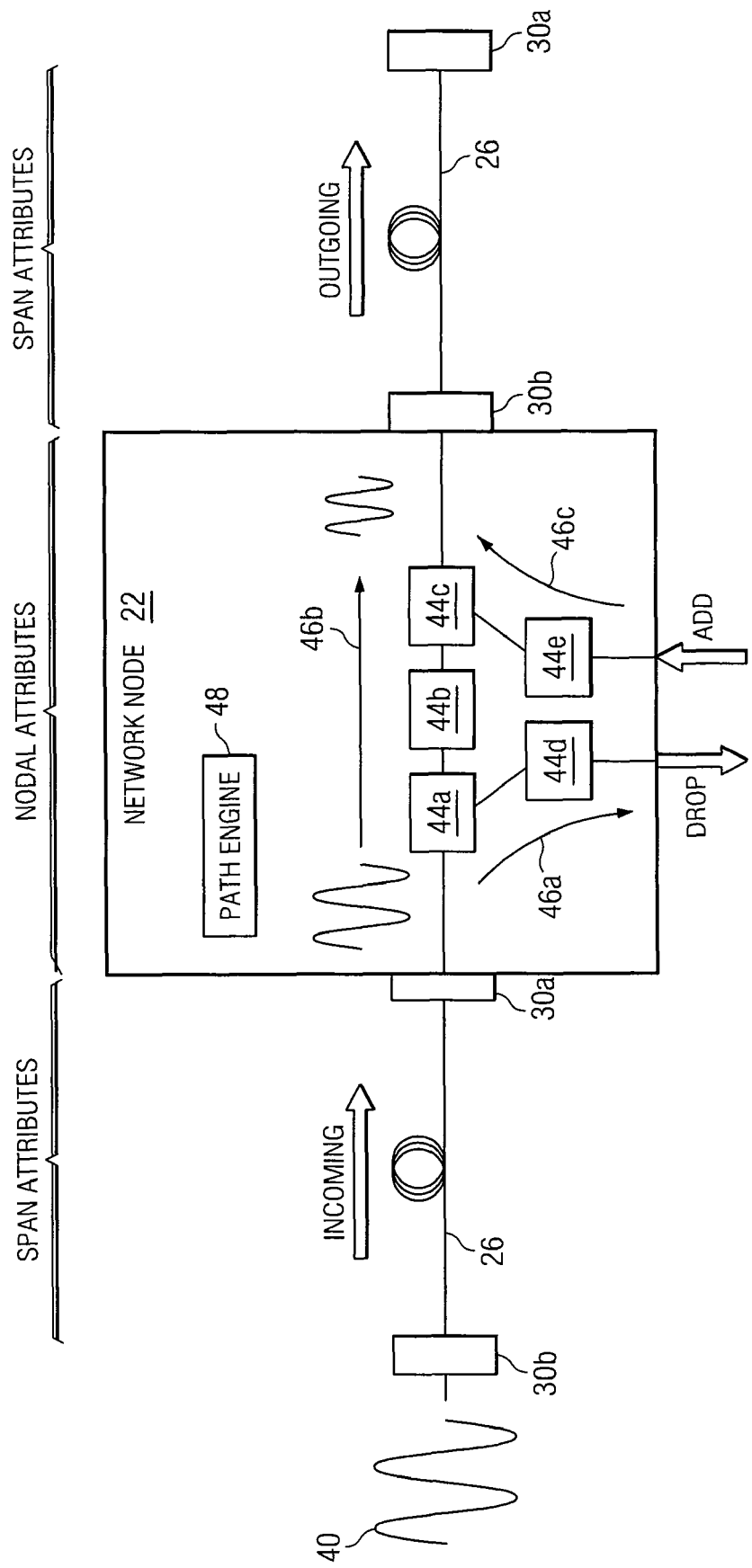
FIG. 2 illustrates one embodiment of a portion of the network of FIG. 1 for which signal reachability information may be advertised.

FIG. 2 illustrates one embodiment of a portion of network 10 of FIG. 1 for which signal reachability information may be advertised. In particular embodiments, a link 30 of network node 22 may be configured to establish signal reachability information that describes attributes that affect the reachability of an optical signal. Link 30 may insert the signal reachability information in an advertisement and send the advertisement to other network nodes 22. Network node 22 may use the GMPLS protocol to distribute signal reachability information while on-line or off-line. Attributes may be distributed with incoming and/or outgoing advertisements.

In particular embodiments, signal reachability information describes attributes that affect the reachability of an optical signal. Optical signals have limited reach. As a signal travels through a circuit, the signal may be modified (such as attenuated or distorted) and fail to communicate the information that it carries. The reachability of a signal may describe the reach that the signal has before failing to communicate information.

An attribute may result from physical features of components of a circuit. Attributes include nodal attributes and span attributes. A nodal attribute of a network node 22 results from physical features the network node 22 (such as the type of device). Examples of nodal attributes include a node optical signal-to-noise ratio (OSNR), a node polarization mode dispersion (PMD), a node cross-talk (XT), a node pass-band narrowing (PBN), and a node dispersion.

Different paths within a network node 22 may have different physical features, so different paths may have different nodal attributes. In the illustrated embodiment, the portion includes physical components 44 (44a, 44b, ..., and/or 44e) of network node 22. Components 44 may affect the signal reachability of a signal 40.

In the illustrated embodiment, paths 46 (46a, 46b, and/or 46c) through network node 22 pass through components 44. A drop path 46a passes through components 44a and 44d; a pass-thru path 46b passes through components 44a, 44b, and 44c; and an add path 46c passes through components 44c and 44e. Components 44 of a path 46 affect the nodal attributes of path 46. For example, components 44a and 44d affect nodal attributes of drop path 46a. A nodal attribute of a path 46 may be associated with a starting link 30 and an ending link 30 of the path 46.

Span attributes result from physical features (such as fiber type) of the span. Examples of span attributes include an incoming span dispersion, an incoming span polarization mode dispersion (PMD), an incoming span cross-talk (XT), and an outgoing transmit optical power. Span attributes for a wavelength of a span 26 may be associated with a wavelength channel identifier of the wavelength.

In particular embodiments, signals 40 from a first output link 30b travel through a first span 26 to a first input link 30a of network node 22. As signals 40 travel through first span 26, span attributes of first span 26 affect the signal reachability of signals 40. Signals 40 may travel across a drop path 46a, a pass-thru path 46b, or an add path 46c of network node 22. Nodal attributes of the traveled path 46 affect signal 40. From output link 30b, signals 40 travel through a second span 26 to a second input link 30a. Span attributes of second span 26 affect the reachability of signals 40.

In particular embodiments, a link 30 sends advertisements that include signal reachability information associated with link 30, for example, information about attributes that affect reachability of a signal entering and/or leaving link 30. For example, input link 30a sends advertisements that include span attributes of first span 26 and/or nodal attributes of drop path 46a. Examples of the span attributes include a span dispersion, polarization mode dispersion, and/or cross-talk. Examples of the nodal attributes include a node polarization mode dispersion, optical signal-to-noise ratio, cross-talk, pass band narrowing, and/or dispersion.

In the example, output link 30b sends advertisements that include nodal attributes of a pass-thru path 46b and/or add path 46c. Examples of the nodal attributes include a node polarization mode dispersion, optical signal-to-noise ratio, cross-talk, pass band narrowing, dispersion, and/or transmit power.

A nodal attribute advertisement for an attribute may include the starting link 30 and ending link 30 of the path with the attribute, the signal type, and the nodal attribute. For example, the advertisement for PMD may include the starting link, ending link, signal type, and PMD. Signal type may indicate the data rate of the signal, for example, 2.5 G, 10 G, 40 G, or greater. The signal type may also indicate whether there is a forward error correction (FEC), out-of-band (OOB), or maximum likelihood sequence estimate (MLSE).

A span attribute advertisement of a wavelength may include the wavelength channel identifier of the wavelength and the span attribute. For example, the advertisement for 2.5 g/10 g incoming span dispersion may include the incoming span dispersion plus and incoming dispersion minus. The 40 g incoming span dispersion may include the wave channel identifier, incoming span dispersion, incoming span average dispersion, incoming span dispersion deviation, incoming dispersion compensation module (DCM) average dispersion, and incoming DCM dispersion deviation. The 2.5 g/10 g span dispersion target may specify the acceptable total span dispersion target for a signal type.

In particular embodiments, a path engine 48 of network node 22 calculates the path for a circuit. Path engine 48 may include a calculated shortest path first (CSPF), explicit route object (ERO), or other suitable path calculation engine.

In particular embodiments, path engine 48 gathers signal reachability information to calculate the signal reachability of a circuit. Signal reachability for a circuit may be calculated from the values for the nodal and/or span attributes of the circuit, as discussed below. In particular embodiments, path engine 48 may receive a signal request that includes, for example, a signal rate request, such as 2.5 G, 10 G, or 40 G. Path engine 48 determines if the signal reachability of the circuit can satisfy the request. If an attribute fails to satisfy an attribute threshold, then the circuit is not reachable. In certain embodiments, an attribute threshold depends on the signal type.

Path engine 48 may calculate the circuit attributes of circuit signal reachability in any suitable manner. In particular embodiments, a circuit attribute may be calculated from a function of the values of the attributes of the circuit. Certain attributes may have values for span attributes, nodal attributes, or both span and nodal attributes. In one example, a circuit starts at a source network node 22, passes through various spans 26 and intermediate network nodes 22, and ends at destination network node 22. Criteria attributes may be calculated from a function of the values of the nodal attributes of an add path 46a of source network node 22, span attributes of the spans 26, nodal attributes of the pass-thru paths 46b of intermediate network nodes 22, and/or nodal attributes of a drop path 46b of destination network node 22.

Below are examples of functions that may be used to calculate circuit attributes from the values of the attributes of the circuit. In the examples, $ATT_X$ represents a nodal or span attribute. If $ATT_X$ represents a nodal attribute for a path of a network node, then $ATT_X$ may be expressed as $ATT_{path,node}$. Add may represent an add path 46a, Pass may represent a pass-thru path 46b, and Drop may represent a drop path 46c. Source may represent a source network node, Int may represent an intermediate network node, and Dest may represent a destination network node. Intermediate network node j, where j=1, ..., M, may be represented by Intj. If $ATT_X$ represents a span attribute, then $ATT_X$ may be expressed as $ATT_{Spani}$, where Spani represents span i of a circuit, where i=1, ..., N.

In particular embodiments, the polarization mode dispersion (PMD) of a circuit may be calculated according to the following function:

$$TotalPMD = \sqrt{PMD_{Add,Source}^2 + \sum_{i=1}^{N} PMD_{Spani}^2 + \sum_{j=1}^{M} PMD_{Pass,Intj}^2 + PMD_{Drop,Dest}^2}$$

The circuit attribute need not include both span and nodal attributes. For example, the total OSNR may be calculated according to the following equation:

$$TotalOSNR = -10 \times \log_{10}\left(OSNR_{Add,Source} + \sum_{j=1}^{M} OSNR_{Pass,Intj} + OSNR_{Drop,Dest}\right) - OSNR_{penalty}$$

The $OSNR_{penalty}$ may be computed according to:

$$OSNR_{penalty} = \sum_{2}^{P} ATT\_OSNR_{penaltyk}$$

where $ATT\_OSNR_{penaltyk}$ represents an OSNR penalty of a particular attribute k, where k=1, 2, ..., P.

An attribute OSNR penalty may be computed in any suitable manner. For example, a pass-band narrowing (PBN) OSNR penalty may be calculated according to:

$$PBN\_OSNR_{penalty} = PBN_{Add,Source} + \sum_{j=1}^{M} PMD_{Pass,Intj} + \ldots + PBN_{drop,dest}$$

A cross-talk OSNR penalty may be calculated according to:

$$XT\_OSNR_{penalty} = XTCoeff_A \times \exp(XTCoeff_B \times TotalXT)$$

where TotalXT represents the total cross-talk and $XTCoeff_A$ and $XTCoeff_B$ represent cross-talk coefficients A and B, respectively. The total cross-talk may be calculated according to:

$$Total\ XT = 10 \times \log_{10}\left[10^{XTAdd,Source/10} + \sum_{i=1}^{N} 10^{XTSpani/10} + \sum_{j=1}^{M} 10^{XTPass,Intj/10} + 10^{XTDrop,Dest/10}\right]$$

Cross-talk coefficients A and B may depend on the signal rate of the requested signal.

A polarization mode dispersion (PMD) OSNR penalty may be calculated according to:

$$PMD\_OSNR_{penalty} = PMDCoeff_A \times PMDtmp^3 + PMDCoeff_B \times PMDtmp^2 + PMDCoeff_B \times PMPtmp + PMDCoeff_D - 0.5$$

where PMDtmp is calculated from the total PMD and bitrate, and $PMDCoeff_A$ through $PMDCoeff_D$ represent PMD Coefficients A through D, respectively. The PMD coefficients and bitrate may depend on requested signal rate. Other attributes OSNR penalties may be calculated, such as a dispersion and other penalties.

FIGS. 3A through 4B illustrate examples of wavelength connectivity information that may be advertised. In particular embodiments, a link 30 of network node 22 may be configured to establish wavelength connectivity information that describes wavelength availability between an input link 30a and output link 30b. Link 30 may insert the signal reachability information in an advertisement and send the advertisement to other network nodes 22. The information may be provided in real time for all the appropriate combinations between the input links 30a and output links 30b of network node 22.

In particular embodiments, wavelength connectivity information describes wavelength availability between an input link 30a and an output link 30b of a link pair. Wavelength connectivity information may indicate one or more wavelengths available between input link 30a and output link 30b, whether the signal is regenerated, whether a wavelength is converted, and/or whether a wavelength can be added or dropped.

In particular embodiments, the advertised information may include the identifier of input link 30a, one or more allowed incoming wavelengths, one or more allowed outgoing wavelengths, and/or signal type. Wavelengths may be designated by the channel identifier of the wavelength. The signal type may indicate whether the signal may undergo optical-to-electrical-to-optical (O-E-O) regeneration.

In particular embodiments, certain values may be set to zero. For example, an input link identifier may be set to zero if the advertisement applies to all links of node 22. As another example, an allowed incoming wavelength may be set to zero if all appropriate wavelengths are allowed. As yet another example, an outgoing wavelength may be set to zero if there is no wavelength conversion. Zero values need not be advertised, which may reduce the size of information to be advertised.

Figure 3A:
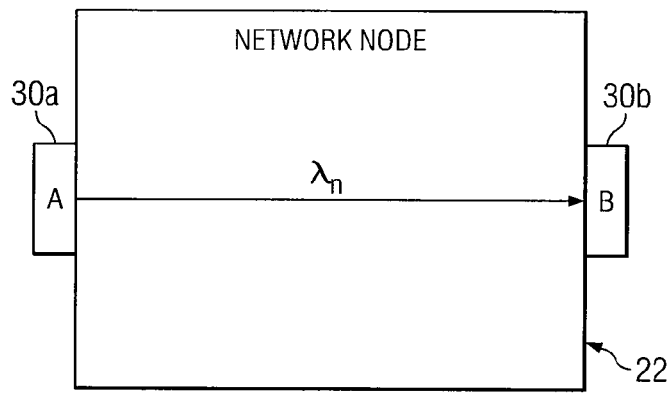
FIGS. 3A through 4B illustrate examples of wavelength connectivity information that may be advertised.

FIG. 3A illustrates a situation in which any wavelength channel at input link 30a is allowed to connect to any wavelength channel at output link 30b. The advertisement may indicate that the allowed from link identifier is link A, the allowed from wavelength channel identifier is 0, and the allowed to wavelength channel identifier is 0.

Figure 3B:
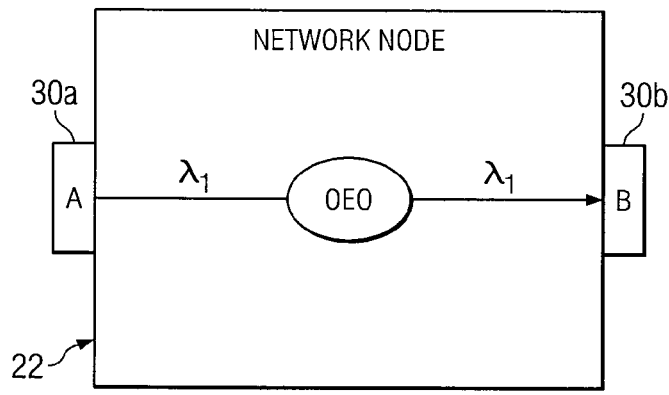

FIG. 3B illustrates a situation in which a first wavelength channel $\lambda_1$ at input link 30a is allowed to connect with optical-to-electrical-to-optical conversion to the first wavelength channel $\lambda_1$ at output link 30b. The advertisement may indicate that the allowed from link identifier is link A, the allowed from wavelength channel identifier is $\lambda_1$, and the allowed to wavelength channel identifier is 0.

Figure 3C:
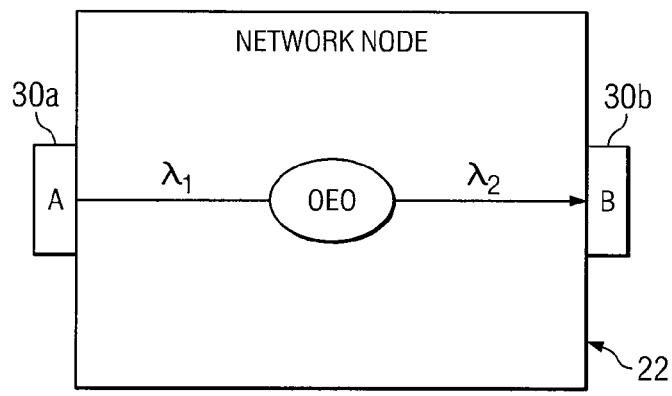

FIG. 3C illustrates a situation in which a first wavelength channel $\lambda_1$ at input link 30a is allowed to connect with optical-to-electrical-to-optical conversion to a second wavelength channel $\lambda_2$ at output link 30b. The advertisement may indicate that the allowed from link identifier is link A, the allowed from wavelength channel identifier is $\lambda_1$, and the allowed to wavelength channel identifier is $\lambda_2$.

Figure 4A:
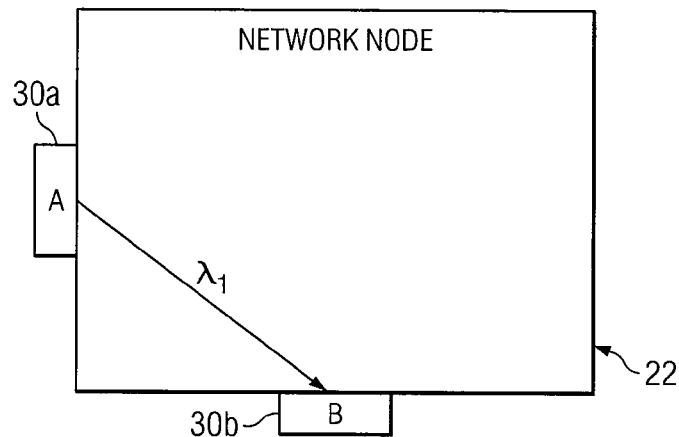

FIG. 4A illustrates a situation in which a first wavelength channel from input link 30a is allowed to drop to first wavelength channel $\lambda_1$ at output link 30b. The advertisement may indicate that the allowed from link identifier is link A, the allowed from wavelength channel identifier is $\lambda_1$, and the allowed to wavelength channel identifier is 0.

Figure 4B:
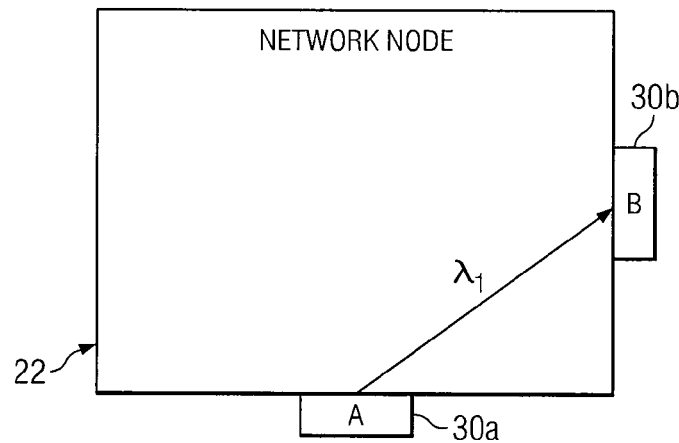

FIG. 4B illustrates a situation in which a first wavelength channel from input link 30a is allowed to add to the first wavelength channel at the output link 30b. The advertisement may indicate that the allowed from link identifier is link A, the allowed from wavelength channel identifier is $\lambda_1$, and the allowed to wavelength channel identifier is 0.

Figure 5:
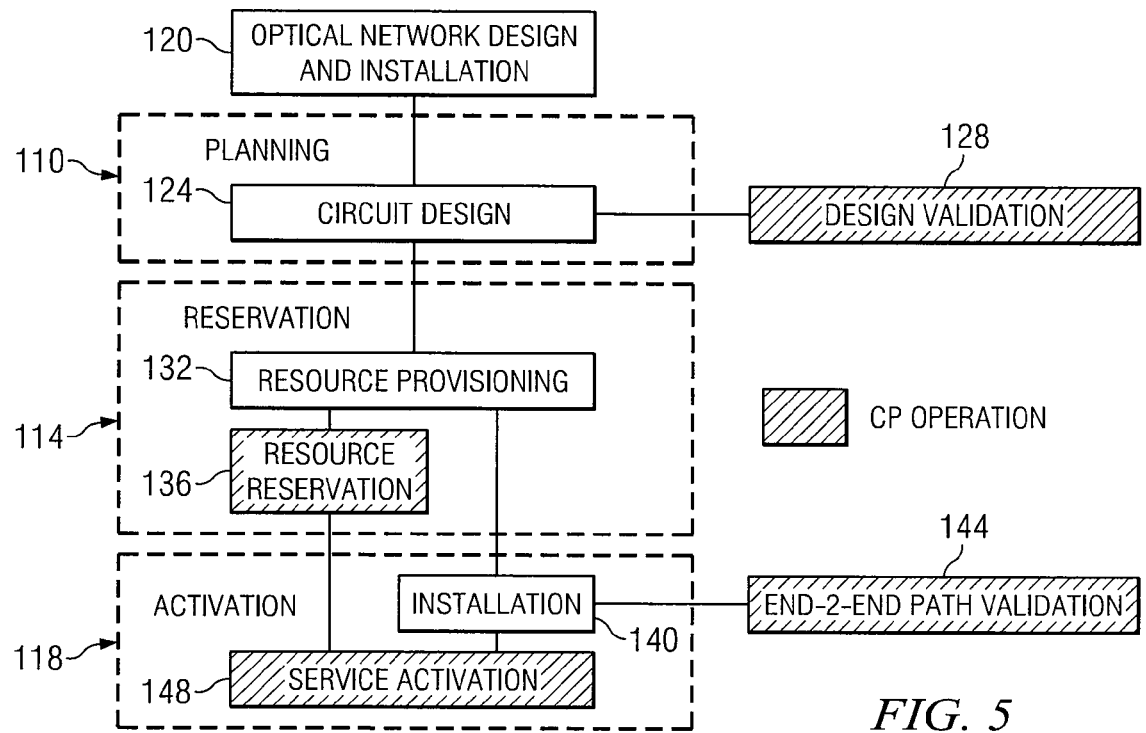
FIG. 5 illustrates one embodiment of a method for setting up a circuit.

FIG. 5 illustrates one embodiment of a method for setting up a circuit. In particular embodiments, control plane logic may be configured to establish that planning pre-conditions for planning a circuit have been satisfied and initiate the planning of the circuit. The control plane logic may also establish that reservation pre-conditions for reservation of resources for the circuit have been satisfied and initiate reservation of the resources for the circuit. The control plane logic may also establish that activation pre-conditions for activation of the circuit have been satisfied and initiate the activation of the circuit. In particular embodiments, establishing that a pre-condition has been satisfied may involve receiving a message that pre-condition has been satisfied.

The method includes a planning stage 110, a reservation stage 114, and an activation stage 118. An optical network may be designed and installed at step 120. The control plane logic may establish that one or more planning pre-conditions have been satisfied prior to initiating planning stage 110. Examples of planning pre-conditions may include network nodes 22 have been configured and are running, wavelength-division multiplexing (WDM) facilities have been provisioned, and spans 26 have been installed. The control plane logic may initiate planning stage 110 by sending a planning command that includes source network node 22 and destination network node 22 of a circuit to be designed.

At planning stage 110, the circuit may be designed at step 124 of planning stage 110. Circuit design may involve determining of the nodes 22 of the circuit and may take into account information provided by advertisements sent from the network nodes 22. For example, the design may take into account the wavelength connectivity information and the signal reachability information. The path of the circuit may be stored in a database. Control plane logic may provide design validation at step 128. Design validation validates the design of the circuit path.

The control plane logic may establish that one or more reservation pre-conditions have been satisfied prior to initiating reservation stage 114. Examples of reservation pre-conditions may include the circuit has been designed, the equipment has been provisioned, and the spans 26 and nodes 22 have been connected. The control plane logic may initiate reservation of the resources for the circuit by sending a reservation command.

At reservation stage 114, resources are provisioned at step 132. Resources are reserved by the control plane logic at step 136. Resources may include optical and/or physical resources such as channel, route, cross-connect points, and optical line card shelf resources. The network resources may be reserved from end to end by signaling.

The control plane logic may establish that one or more activation pre-conditions have been satisfied prior to initiating activation stage 118. Examples of activation pre-conditions include resource reservation has been completed and equipment has been installed. The control plane logic may initiate activation of the circuit by sending an activation command.

At activation stage 118, the circuit is installed at step 140. Equipment and fiber connections may be installed based upon the reservation entry. The path may be validated by the control plane logic at step 144. The control plane logic may activate the path at step 148. Database notifications may be sent to indicate the change of state of the nodes 22 of the path.

Modifications, additions, or omissions may be made to the methods without departing from the scope of the invention. The method may include more, fewer, or other steps. Additionally, steps may be performed in any suitable order.

Certain embodiments of the invention may provide one or more technical advantages. A technical advantage of one embodiment may be that a link (for example, a traffic engineering link) of a network node may be configured to establish signal reachability information that describes attributes that affect the reachability of an optical signal. The network node may advertise the information while the node is on-line.

Certain embodiments of the invention may include none, some, or all of the above technical advantages. One or more other technical advantages may be readily apparent to one skilled in the art from the figures, descriptions, and claims included herein.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
    establishing signal reachability information at a network node of a network, the network comprising a plurality of network nodes and a plurality of spans, the signal reachability information including one or more attributes that affect reachability of an optical signal, wherein the reachability of a signal is the reach that the signal has before failing to communicate information, the one or more attributes comprising at least one nodal attribute associated with one or more physical features of the network node that affect signal reachability and at least one span attribute associated with one or more physical features of a span that affect signal reachability;
    inserting the signal reachability information into an advertisement; and
    sending the advertisement to at least a subset of the network nodes of the network while the network node is on-line.

2. The method of claim 1, the advertisement comprising a traffic engineering (TE) link advertisement.

3. The method of claim 1:
    the establishing the signal reachability information at the network node further comprising:
        establishing the signal reachability information at a traffic engineering (TE) link of the network node; and
    the sending the advertisement to at least a subset of the network nodes further comprising:
        sending the advertisement from the traffic engineering link.

4. The method of claim 1, the one or more attributes comprising a nodal attribute selected from a group consisting of:
    a node optical signal-to-noise ratio (OSNR);
    a node polarization mode dispersion (PMD);
    a node cross-talk (XT);
    a node pass-band narrowing (PBN); and
    a node dispersion.

5. The method of claim 1, the one or more attributes comprising a span attribute selected from a group consisting of:
    an incoming span dispersion;
    an incoming span polarization mode dispersion (PMD);
    an incoming span cross-talk (XT); and
    an outgoing transmit optical power.

6. The method of claim 1:
    the one or more attributes comprising a nodal attribute of the network node, the network node comprising a first traffic engineering (TE) link and a second traffic engineering link; and
    the signal reachability information identifying:
        the first traffic engineering link; and
        the second traffic engineering link.

7. The method of claim 1:
    the one or more attributes comprising a span attribute of a wavelength of span; and
    the signal reachability information comprising a wavelength channel identifier of the wavelength.

8. The method of claim 1, further comprising:
    receiving a plurality of advertisements comprising signal reachability information of a circuit, the plurality of advertisements comprising the sent advertisement; and
    calculating signal reachability of a circuit from the signal reachability information of the circuit.

9. One or more computer-readable tangible media encoding software operable when executed by a computer to:
    establish signal reachability information at a network node of a network, the network comprising a plurality of network nodes and a plurality of spans, the signal reachability information including one or more attributes that affect reachability of an optical signal, wherein the reachability of a signal is the reach that the signal has before failing to communicate information, the one or more attributes comprising at least one nodal attribute associated with one or more physical features of the network node that affect signal reachability and at least one span attribute associated with one or more physical features of a span that affect signal reachability;
    insert the signal reachability information into an advertisement; and
    send the advertisement to at least a subset of the network nodes of the network while the network node is on-line.

10. The computer-readable tangible media of claim 9, the advertisement comprising a traffic engineering (TE) link advertisement.

11. The computer-readable tangible media of claim 9:
    further operable to establish the signal reachability information at the network node by:
        establishing the signal reachability information at a traffic engineering (TE) link of the network node; and
    further operable to send the advertisement to at least a subset of the network nodes by:
        sending the advertisement from the traffic engineering link.

12. The computer-readable tangible media of claim 9, the one or more attributes comprising a nodal attribute selected from a group consisting of:
    a node optical signal-to-noise ratio (OSNR);
    a node polarization mode dispersion (PMD);
    a node cross-talk (XT);
    a node pass-band narrowing (PBN); and
    a node dispersion.

13. The computer-readable tangible media of claim 9, the one or more attributes comprising a span attribute selected from a group consisting of:
    an incoming span dispersion;
    an incoming span polarization mode dispersion (PMD);
    an incoming span cross-talk (XT); and
    an outgoing transmit optical power.

14. The computer-readable tangible media of claim 9:
    the one or more attributes comprising a nodal attribute of the network node, the network node comprising a first traffic engineering (TE) link and a second traffic engineering link; and
    the signal reachability information identifying:
        the first traffic engineering link; and
        the second traffic engineering link.

15. The computer-readable tangible media of claim 9:
    the one or more attributes comprising a span attribute of a wavelength of span; and
    the signal reachability information comprising a wavelength channel identifier of the wavelength.

16. The computer-readable tangible media of claim 9, further operable to:
  receive a plurality of advertisements comprising signal reachability information of a circuit, the plurality of advertisements comprising the sent advertisement; and
  calculate signal reachability of a circuit from the signal reachability information of the circuit.

17. A system comprising:
  means for establishing signal reachability information at a network node of a network, the network comprising a plurality of network nodes and a plurality of spans, the signal reachability information including one or more attributes that affect reachability of an optical signal, wherein the reachability of a signal is the reach that the signal has before failing to communicate information, the one or more attributes comprising at least one nodal attribute associated with one or more physical features of the network node that affect signal reachability and at least one span attribute associated with one or more physical features of a span that affect signal reachability;
  means for inserting the signal reachability information into an advertisement; and
  means for sending the advertisement to at least a subset of the network nodes of the network while the network node is on-line.

* * * * *